United States Patent
Boylan et al.

(10) Patent No.: US 6,490,179 B1
(45) Date of Patent: Dec. 3, 2002

(54) POST-REGULATED POWER SUPPLY

(75) Inventors: Jeffrey John Boylan, Richardson, TX (US); Gary Robert Kidwell, Plano, TX (US)

(73) Assignee: Innoveta Technologies, Plano, TX (US)

( * ) Notice: Subject to any disclaimer, the term of this patent is extended or adjusted under 35 U.S.C. 154(b) by 0 days.

(21) Appl. No.: 09/999,010

(22) Filed: Oct. 31, 2001

(51) Int. Cl.$^7$ .............................................. H02M 3/335

(52) U.S. Cl. ...................... 363/21.06; 363/89; 363/127; 363/67

(58) Field of Search ................................ 363/20, 21.01, 363/21.06, 21.14, 21.04, 65, 67, 84, 89, 95, 97, 125, 127

(56) References Cited

U.S. PATENT DOCUMENTS

| | | | | |
|---|---|---|---|---|
| 6,130,828 A | * | 10/2000 | Rozman | 363/21.06 |
| 6,222,747 B1 | | 4/2001 | Rinne et al. | |
| 6,297,970 B2 | * | 10/2001 | Hemena et al. | 363/21.06 |
| 6,434,026 B1 | * | 8/2002 | Malik et al. | 363/21.14 |
| 6,442,048 B1 | * | 8/2002 | Sun et al. | 363/21.14 |
| 6,445,597 | * | 9/2002 | Boylan et al. | 363/21.06 |

OTHER PUBLICATIONS

Rudolf P. Stevens, Gordon (ED) Bloom; Modern DC—To—DC Switchmode power Converter Circuits, Van Nostrand Reinhold Electrical/Computer Science and Egnineering Series, © 1985; pp. 13–29, Van Nostrand Reinhold Company, New York.

Texas Instruments Data Sheet; TPS2830, TPS2831 Fast Synchronous–Buck MOSFET Drivers with Dead–Time Contro Jan. 1, 2001, Texas Instrument Incorporated.

* cited by examiner

*Primary Examiner*—Adolf Deneke Berhane
(74) *Attorney, Agent, or Firm*—Carstens Yee & Cahoon LLP; David W. Carstens

(57) ABSTRACT

An architecture for a post regulator control circuit that utilizes an advance trigger signal to trigger the post regulator ramp. This advance trigger signal anticipates the beginning and end of a power cycle, and can be used to drive all of the secondary rectifier switches with optimal timing to minimize both cross conduction and body diode conduction. The architecture can be used to cascade an arbitrary number of post regulators. The present invention provides to the auxiliary outputs the full range of regulation available to the main output even in light load conditions. Rather than sensing the beginning or end of the power cycle, the present invention anticipates the beginning and end of the power cycle using the pulse train generated by the feedback loop for the main output. This allows the circuit to prepare the switches for the beginning of the power cycle and avoids problems encountered with inherent propagation delays in the circuit. Using the advance trigger signal, all of the switches may be driven with precise timing.

20 Claims, 7 Drawing Sheets

POST-REGULATED POWER SUPPLY

BACKGROUND OF THE INVENTION

1. Technical Field

The present invention is directed to a power system and more particularly to a method and apparatus for providing post-regulation for a switch mode power supply with multiple outputs.

2. Description of Related Art

Integrated circuits continue their trend toward higher transistor densities and smaller feature sizes. As the technology for the various devices drifts toward different power supply requirements, various low voltage standards have been established. While early "logic circuits" used 5V, today's devices require 5V, 3.3V, 2.8V, 2.5V, 2.0V, 1.8V, 1.5V, 1.2V, 0.9V and others. Consequently, mixed low voltage systems have become commonplace. The packaging density and thermal demands have likewise continued to grow with each new generation of product. As a result, there is a need for power converters with high density, high efficiency, and multiple outputs with independent regulation, to energize these systems.

Another demand for a multiple output power converter is flexibility. Because few applications need exactly the same combination of output voltages and output currents, a successful catalog product should address a broad set of applications. This versatility can be achieved through adjustable output voltages and flexible output loading.

During the development of power supplies with the needed flexibility, several approaches have been suggested in the prior art. Some approaches have used linear regulation, but such a technique results in low efficiency especially if wide input voltage variations are present and is limited to power converters in which the load current of the auxiliary output is relatively low. A magnetic amplifier output regulator has also been used as a means for regulating more than one output of a switching supply. However, the magnetic amplifiers tend to be bulky, expensive, lossy (especially where the switching frequency is high), and have a limited control range in that minimum delay times reduce the maximum achievable output voltage for the auxiliary outputs. Cross regulation is another approach that has been suggested. This approach uses the winding ratios in the transformers to set the ratio between the main output and the auxiliary output. The drawbacks of cross regulation techniques include poor regulation, poor resolution in ratio selection, and no independent output adjustment. Yet another approach has been to connect one or more buck converters to the output of the main converter to deliver independently regulated outputs. However, this approach results in noise reflected back to the main output. This noise problem can be avoided if the auxiliary outputs are derived from the pulsating voltage at the secondary side of the transformer rather than from the output of the main converter. This most recent approach is commonly referred to as switching post regulation.

Phase modulation techniques have also been applied to switching post regulators to regulate the auxiliary outputs. Both leading edge and trailing edge modulation techniques have been suggested in the prior art. While trailing edge modulation (leading edge synchronization) is a viable option, it complicates the use of primary-peak-current-mode control of the main output. During trailing edge modulation, the termination of the post-regulator pulse results in a current signal in the primary switch with a peak value that does not necessarily occur at the end of the duty cycle pulse. This can result in current control instabilities. Similarly, primary-side peak current limit can be complicated with trailing edge modulation, using either peak current control or voltage mode control because there are two current peaks in the inductor current making it hard to detect the proper peak to use for current limit. Leading edge modulation (trailing edge synchronization) simplifies primary-side peak current limit by assuring that the current level at the end of the power delivery cycle is at its peak value.

A typical example of a leading edge modulation approach is a secondary side post regulator controller for DC to DC multiple output converters manufactured by Cherry Semiconductor Corporation (now a part of ON semiconductor) and identified under the product No. CS5101. A description of this product is found in Cherry Semiconductor Corporation's "Secondary Side Post Regulator for AC/DC and DC/DC Multiple Output Converters" dated March 1997 and incorporated herein by reference as if fully set forth at length. The post regulator control circuit ensures that the trailing edges of the main and auxiliary outputs are synchronized. A ramp is generated and triggered at the start of the main power delivery cycle and the turn-on of the synchronous switch. Depending on the error of the output voltage of the auxiliary output, a delay between the start of the main power cycle and the turn-on of the synchronous switch is generated. Leading-edge modulation of the auxiliary outputs is achieved. While good efficiency figures, good regulation, and low output noise can be achieved with this scheme, there is still a control circuit propagation delay between the detection of the start of the power cycle and the turn-on of the controlled forward rectifier. This limits the range of the auxiliary outputs because of the duty cycle loss of the auxiliary outputs with respect to the main output. This problem becomes worse as the switching frequency is increased. Use of the noisy secondary winding waveform to synchronize and trigger the ramp can also cause undesirable jitter or instability.

Referring now to FIG. 1, a schematic diagram of a prior art leading edge modulation power converter is illustrated. This circuit is described in further detail in U.S. Pat. No. 6,222,747 to Rinne et al. entitled "Post Regulation Control Circuit for a Switch Mode Power Supply with Multiple Outputs," issued Apr. 24, 2001 and incorporated herein by reference as if fully set forth at length. Rinne et al. teaches resetting the ramp generator by detecting the end of the power cycle. Rinne et al. also displays diode rectified main outputs in the preferred embodiments. While the Rinne approach offers advantages in increasing the regulation range of the post regulator, the post regulator is unable to maintain regulation during periods of light load on the diode-rectified main output because of the reduced duty cycle and discontinuous inductor current for the main output. Furthermore, though the use of diode rectifiers does not require drive timing for the main output, the efficiency of the converter is compromised when such diode rectifiers are used. For the diode-rectified converter disclosed by Rinne et al, discontinuous inductor current cannot be avoided at load currents near zero. Discontinuous mode will occur below the critical load current point because the diode rectifiers cannot allow negative current to flow. Thus, in discontinuous mode, the voltage transfer function becomes dependent on load. As the load on the main output decreases toward zero, the duty cycle must be reduced to maintain regulation of the main output. This reduction in duty cycle reduces the width of the power cycle available to the post regulators, eventually causing them to lose regulation. For a more detailed description of continuous vs. discontinuous mode, see the textbook entitled *Modern DC-to-DC Switchmode Power Converter Circuits* by Severens and Bloom, dated 1985 and incorporated herein by reference as if fully set forth at length.

Furthermore, Rinne et al. does not address the timing and drive of the main output rectifiers for the case where synchronous rectifiers are used in the main output. Rinne et al. also teaches sensing the end of the power cycle by sensing a noisy secondary winding voltage. As a result, this noise may undesirably couple into the post regulator ramp generator.

What is needed in the art is a post regulator architecture for a power converter that offers full regulation range even during periods of light load on the main output. The architecture should provide means for synchronizing and providing a precise drive for all of the secondary rectifier switches in both outputs. The architecture should eliminate the noise coupling problems found in the prior art while providing an efficient and inexpensive regulation of the main and auxiliary outputs.

SUMMARY OF THE INVENTION

The present invention is an architecture for a post regulator control circuit that utilizes an advance trigger signal to trigger the post regulator ramp. This advance trigger signal anticipates the beginning and/or end of a power cycle, and can be used to drive all of the secondary rectifier switches with optimal timing to minimize both cross conduction and body diode conduction. The architecture can be used to cascade an arbitrary number of post regulators. The present invention provides to the auxiliary outputs the full range of regulation available to the main output even in light load conditions. Rather than sensing the beginning or end of the power cycle, the present invention anticipates the beginning and/or end of the power cycle using the pulse train generated by the feedback loop for the main output. This allows the circuit to prepare the switches for the beginning of the power cycle and avoids problems encountered with inherent propagation delays in the circuit. Using the advance trigger signal, all of the switches may be driven with precise timing. Because the advance trigger is not subject to the high currents or leakage inductance ringing associated with the power train operation, it provides a signal with much lower noise and more predictable timing.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
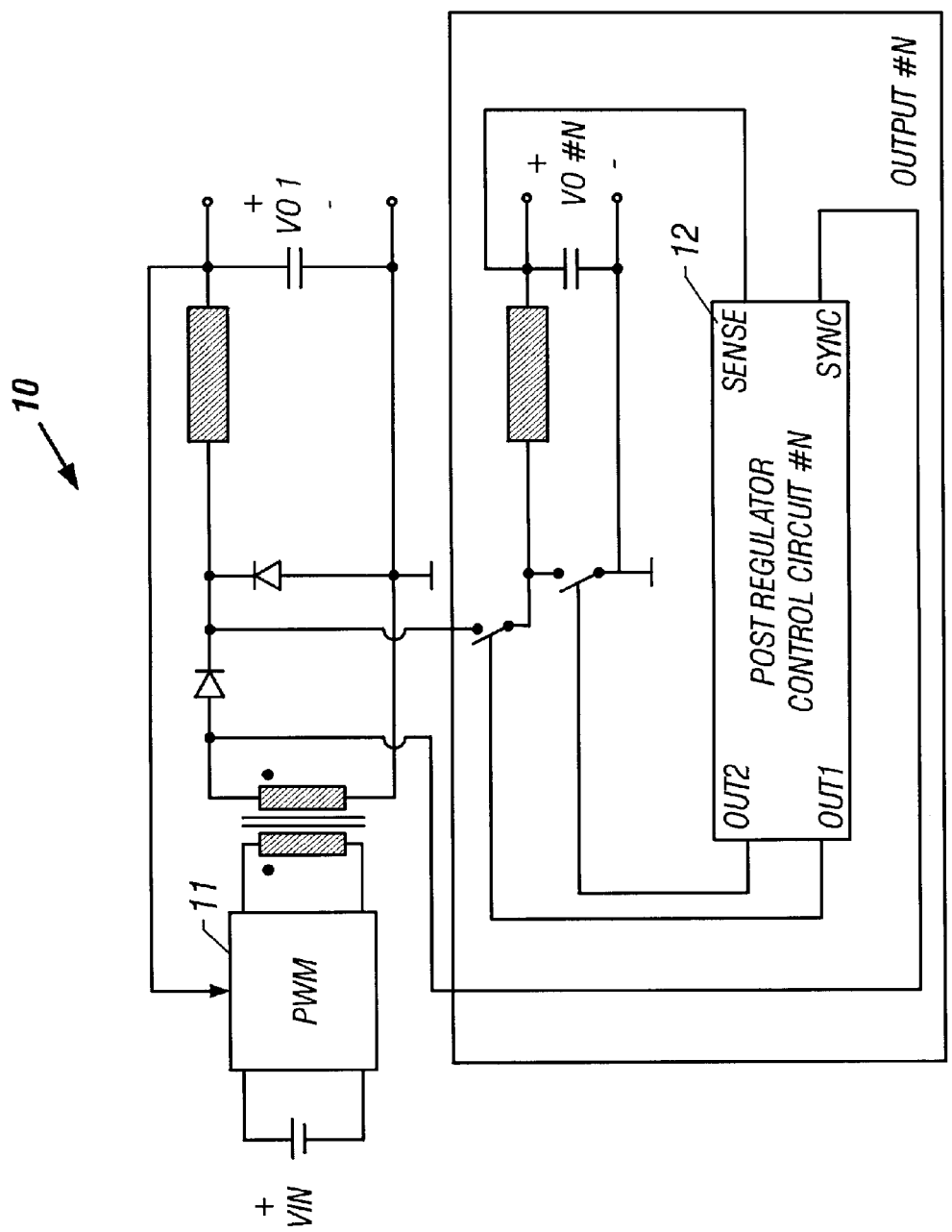
FIG. 1 is schematic diagram of a prior art post-regulated power supply.
Figure 2:
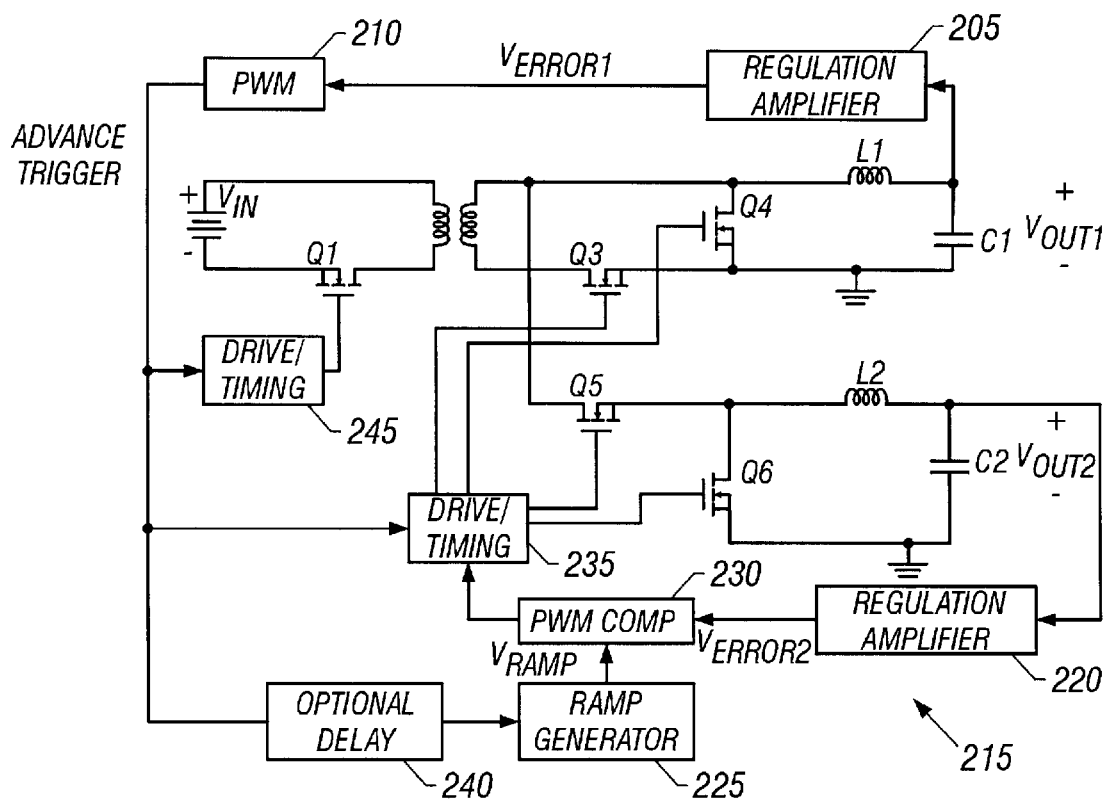
FIG. 2 is a schematic diagram of a post-regulated power supply with synchronous rectifiers in accordance with an embodiment of the invention.

Referring now to FIG. 2, a schematic diagram of a post-regulated power supply with synchronous rectifiers in accordance with an embodiment of the invention is illustrated. The main loop feedback regulates $V_{OUT1}$ by modulating the duty cycle of switch Q1. The regulation amplifier 205 compares the output voltage $V_{OUT1}$ to a reference and generates an amplified error signal $V_{ERROR1}$ based on the difference. The amplified error signal $V_{ERROR1}$ is passed to the Pulse-Width Modulator ("PWM") 210, which generates a pulse train in which the pulse width is proportional to the error signal $V_{ERROR1}$. The output of the PWM 210 is referred to herein as the "advance trigger signal" because it is used to anticipate the beginning or the end of the power cycle. In other words, the "advance trigger signal" can be used to detect a transition of the power cycle from on to off and off to on. This pulse train is applied to control the duty cycle of switch Q1. As the duty cycle of Q1 is modulated, the average voltage applied to the $V_{OUT1}$ output filter (L1 and C1) is controlled, thereby regulating the output voltage $V_{OUT1}$. The synchronous rectifier switches Q3 and Q4 are commonly driven in a complementary manner, where the conduction time of switch Q3 coincides with the conduction time of switch Q1 (duty cycle D1). Switch Q4 is then driven with a duty cycle (1-D1) such that switch Q4 is enabled when switch Q1 and switch Q3 are disabled.

The post-regulator loop 215 regulates the secondary output $V_{OUT2}$ by modulating the duty cycle of switch Q5. An independent regulation amplifier 220 compares the output voltage $V_{OUT2}$ to a predetermined reference, generating a second error signal $V_{ERROR2}$. In one embodiment, the regulation amplifier 220 comprises an inverting error amplifier followed by an inverter. The PWM comparator 230 compares the error signal $V_{ERROR2}$ to the post regulator ramp signal $V_{RAMP}$ that is generated by the ramp generator 225 to generate a second pulse train with duty ratio D2. In the embodiment discussed herein, the ramp signal $V_{RAMP}$ is a rising ramp signal although a falling ramp could also be used. The post regulator PWM comparator 230 in this implementation modulates both the trailing edge of switch Q6 and the variable leading edge for switch Q5.

Figure 3:
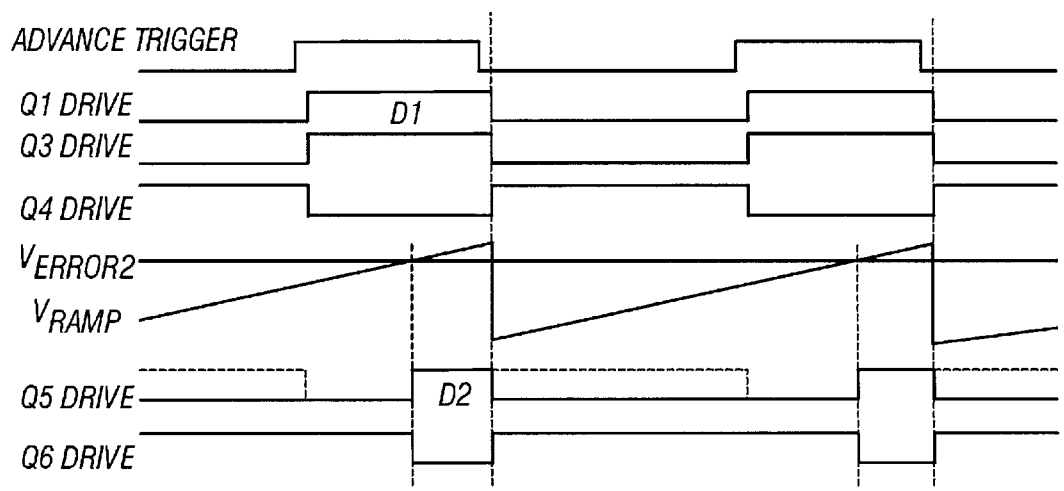
FIG. 3 is a timing diagram of typical signals for the circuit of FIG. 2.

Referring now to FIG. 3, a timing diagram of typical signals for the circuit shown in FIG. 2 is illustrated. This complementary drive scheme provides the lowest conduction drop in the rectifier because the low resistance channel of one MOSFET is always handling the inductor current. However, other drive timing and switching devices other than MOSFETs may be employed without departing from the scope and spirit of the invention.

Practically speaking, because of timing circuit tolerances, the turn-on and turn-off of the complementary FET pairs (Q3/Q4 and Q5/Q6) will not always be simultaneous. Some delay or small overlap between the drive signals will normally be introduced. This edge timing may be set with fixed delay circuits, propagation delay matching, or adaptive timing circuits. For an example of an adaptive timing approach, see the Texas Instruments Data Sheet entitled "TPS2830, TPS 2831 FAST SYNCHRONOUS-BUCK MOSFET DRIVERS WITH DEAD TIME CONTROL," dated January 2001, and incorporated herein by reference as if fully set forth at length. The "dead-time control" discussed therein is a form of adaptive timing.

Referring again to FIG. 3, typical timing waveforms for the post-regulator are illustrated. Because switch Q3 is essentially in series with switch Q5, switch Q3 blocks the negative voltage from the transformer, and thus, switch Q5 and switch Q6 need not be driven in a complementary fashion. In other words, switch Q3 serves as the rectifier for both the main output and the post-regulator output allowing switch Q5 to remain on except when it is blocking part of the Q1/Q3 pulse. The dotted line in the waveform representing the gate drive for switch Q5 in FIG. 3 represents the time period that switch Q5 can remain on without blocking the Q1/Q3 pulse. After switch Q5 is triggered, it can remain on until switch Q1 and switch Q3 are turned on again. In this manner, switch Q5 provides a parallel path for freewheeling current in both the main and auxiliary circuit. In other words, freewheeling current associated with inductor L1 can flow through switch Q4 as well as switches Q5/Q6 and freewheeling current associated with inductor L2 can flow through switch Q6 as well as Q4/Q5.

The present invention provides a significant advantage in that the advance trigger signal from the PWM 210 can be used to integrate the drives for all of the switches, providing synchronization and precise timing. Some delay is provided between the advance trigger signal and the start of the power cycle (the transformer winding being energized by the primary switch Q1). This delay may include a delay circuit, a driver delay, a gate resistor, or just the turn on speed of the MOSFET. This delay allows the start of the power cycle to be anticipated by the advance trigger signal that is connected to all of the switch drives. In this manner, the propagation delay through the transformer to the secondary side is bypassed.

The rising edge of the advance trigger signal may be used to disable switch Q4 with proper timing to prevent cross conduction of the switch with switch Q3 when voltage appears on the transformer winding. If switch Q4 is turned off prematurely, its inherent body diode will conduct. This lossy diode will contribute higher conduction losses, and the slow recovering diode can also exhibit significant reverse recovery losses. Because the delay between the advance trigger signal and the turn-on of switch Q1 is known, the turn-off of switch Q4 can be very closely synchronized with the turn-on of switch Q1, thereby minimizing cross conduction and inherent body diode losses.

The falling edge of the advance trigger signal may be used to reset the post regulator ramp generator 225. When the advance trigger signal is used to reset the post regulator ramp generator 225 before the start of the power delivery cycle, the active regulation range for switch Q5 is between the turn-on and turn-off of switch Q1, i.e. for the entire transformer power delivery cycle.

The use of the falling edge of the advance trigger signal to reset the post regulator ramp before the start of the power delivery cycle allows for some delay through the post regulator PWM comparator 230 and the drive circuits 235 while still allowing the duty cycle of switch Q5 to encompass the full conduction period of switch Q1, if necessary. This allows the post regulator output $V_{OUT2}$ to regulate as high as the main output $V_{OUT1}$.

Alternatively, the rising edge of the advance trigger signal may be used to reset the ramp. If the ramp is reset before the approaching power cycle, generally there would be a shorter time to allow for propagation delays than is available using the falling edge approach. The rising edge could also be fed through a delay sufficient to reset the ramp after the latest turn-on decision point for switch Q5. This would provide additional propagation delay tolerance.

Although the falling edge of the advance trigger signal may also used to signal the turn-on of switch Q4 and switch Q6, as well as the turn-off of switch Q3, it need not be used to control the timing of all of the switches. Depending on the timing scheme implemented, it may be used to synchronize the drive of one or more switches. However, the use of the advance trigger signal to control the switches allows for more precise timing than has been available in the prior art.

The advance trigger signal may be delayed with an optional delay circuit 240, so that the post regulator ramp generator 225 is reset anywhere during the switching period. However, to maintain the advantage of full regulation range, the ramp should preferably be reset sometime between the falling edge of the advance trigger signal and the start of power delivery cycle (switch Q1 on).

The embodiment of the invention disclosed provides full regulation of the auxiliary outputs even under light load conditions. This is accomplished through the use of synchronous rectifiers (bi-directional rectifiers). This performance can be achieved if the main output is operated in fully synchronous mode (down to zero load current), and the output inductor current remains in continuous mode.

In continuous mode, the transfer function of buck-derived converters is not dependent on load (to a first order approximation). Therefore, the duty cycle required to regulate the output voltage is significantly independent of load. If continuous mode is maintained down to zero load, the power cycle pulse width available to the post regulation stages is essentially constant.

Figure 4:
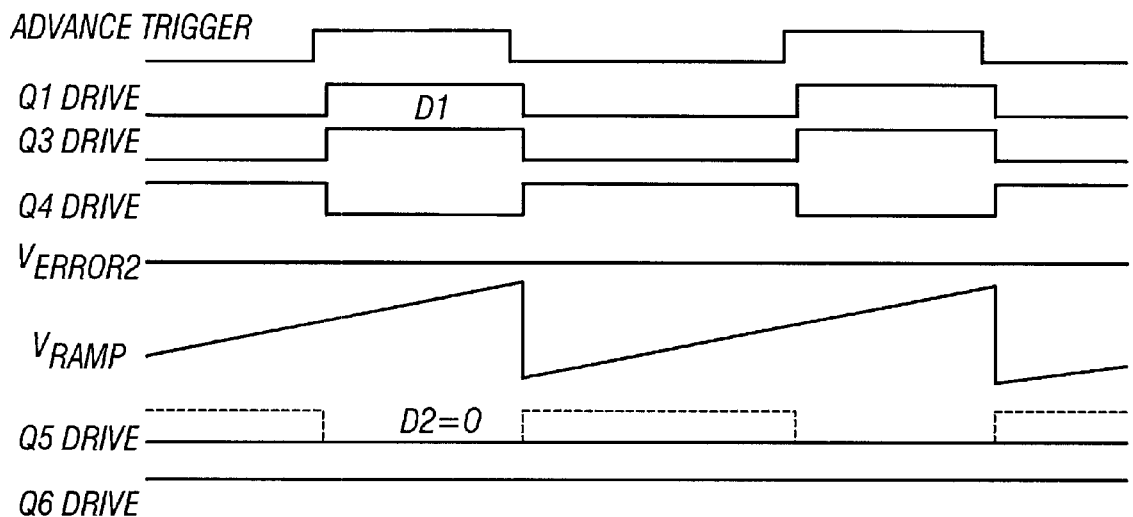
FIG. 4 is a timing diagram showing the circuit of FIG. 2 where the desired value for the auxiliary output is zero.
Figure 5:
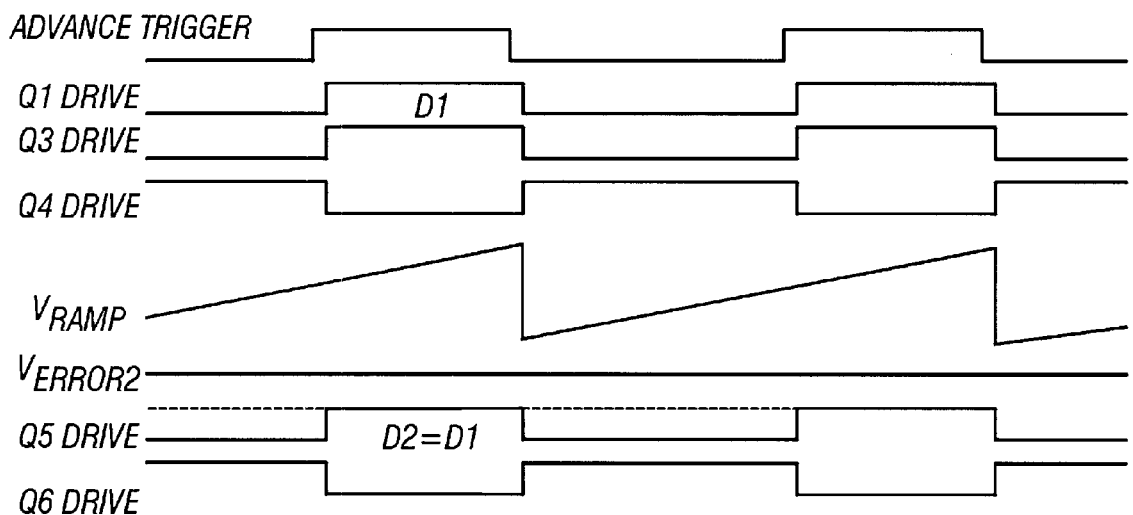
FIG. 5 is a timing diagram showing the circuit of FIG. 2 where the desired value for the auxiliary output approaches the same level as the main output.

Referring now to FIGS. 4 and 5, timing diagrams for the circuit of FIG. 2 at the extremes of the regulation range for the post regulator are illustrated. FIG. 4 shows the operation of the post regulator where the desired value for $V_{OUT2}$ is zero, and consequently D2 is zero. FIG. 5 shows the operation of the post regulator where the desired value for $V_{OUT2}$ approaches $V_{OUT1}$. To achieve the minimum output operation of FIG. 4, the regulation amplifier 220 should be designed so that it can drive the error voltage $V_{ERROR2}$ above the peak of the ramp $V_{RAMP}$. However, propagation delays will allow a lower peak error voltage while still achieving minimum output operation. Due to the propagation delays through the post regulator PWM comparator 230 and the drive stage 235, the ramp generator 225 may actually be reset before the end of the power cycle without compromising regulation range because the decision point for pulse termination necessarily occurs before the end of the cycle. To achieve the maximum output operation of FIG. 5, the regulation amplifier 220 should be designed to drive the error voltage $V_{ERROR2}$ below the minimum value of the ramp $V_{RAMP}$. The ramp may be offset from ground by a fixed offset voltage to facilitate such a design. Because the ramp is reset just after the trailing edge of the advance trigger signal, the post regulator 215 can generate a duty cycle D2 that is equal to the duty cycle D1 of the main output regulator as long as the off time of Q1 is greater than the propagation delay of the post regulator. Although synchronous rectifiers are illustrated in FIG. 2, synchronous, rectifiers need not be used to take advantage of the post regulator control scheme of the present invention.

Figure 6:
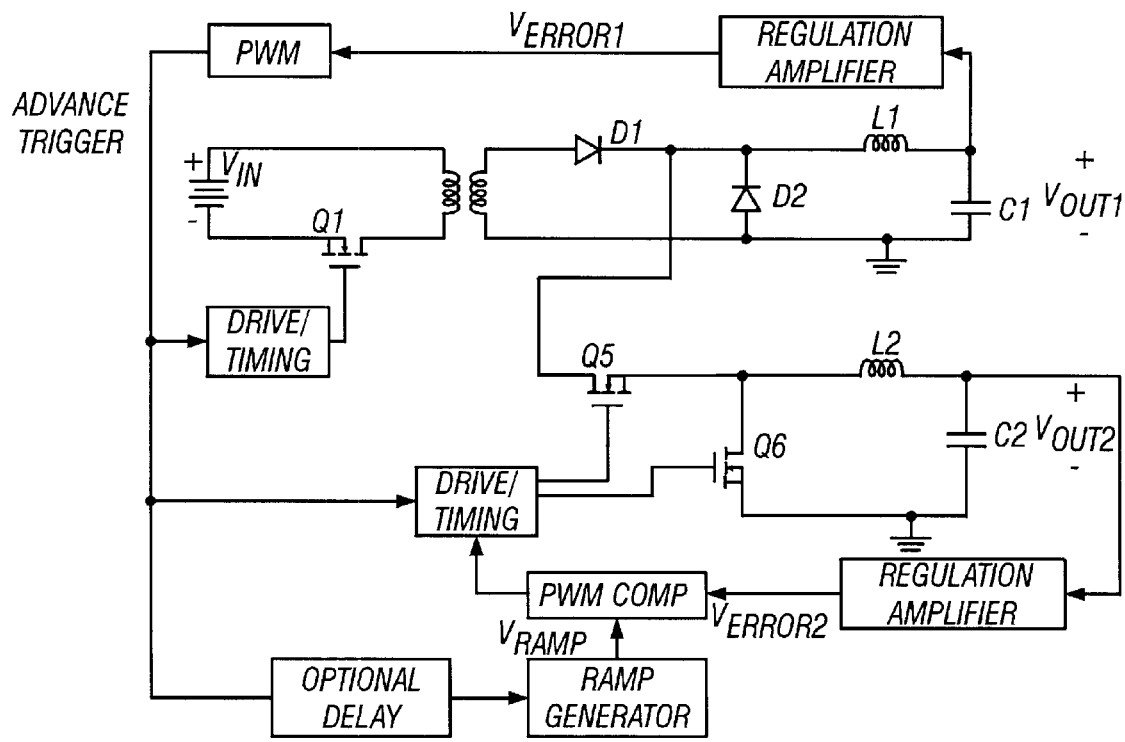
FIG. 6 is a schematic diagram of a post-regulated power supply with diode rectifiers in accordance with an embodiment of the invention.

Referring now to FIG. 6, a schematic diagram of a post-regulated power supply with diode rectifiers in accordance with an embodiment of the invention is illustrated. In this embodiment, diode rectifiers are used in place of the synchronous rectifiers switches Q3 and Q4 used in the embodiment shown in FIG. 2. The synchronous rectifier switch Q6 in FIGS. 2 and 6 could also be replaced with a diode rectifier. However, the switch Q5 should be an active switch to enable modulation of the secondary output. Although diodes can be used with the present invention as shown in FIG. 2, some of the significant advantages of synchronous rectifiers such as efficiency and predictable light load operation may be lost if diodes are used.

Figure 7:
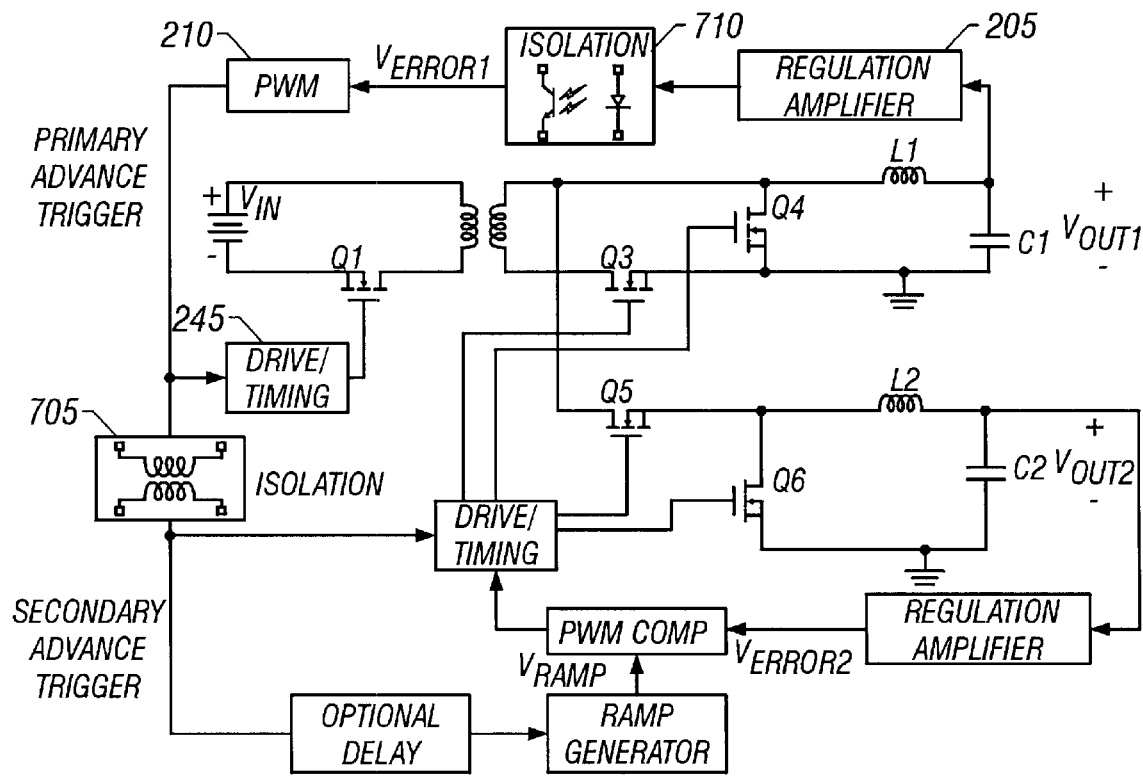
FIG. 7 is a schematic diagram of a post-regulated power supply with isolation circuits in accordance with an embodiment of the invention.

Referring now to FIG. 7, a schematic diagram of a post-regulated power supply with isolation circuits in accordance with an embodiment of the invention is illustrated. Isolation may be introduced at several points in a post-regulated power supply as is well known in the art. In the embodiment shown in FIG. 7, a transformer 705 may be inserted between the output of the PWM 210 and the post-regulation circuit 215. This allows the main output advance trigger signal to be isolated from the post-regulator advance trigger signal while still accomplishing the same functionality as the circuit shown in FIG. 2. Isolation allows the user to refer the input and output terminals to separate grounds, generally with fairly high dielectric strength (high voltage insulation). This isolation is used for system noise control (more effective grounding options), safety (output is protected from dangerous voltages), and flexibility (output polarity can be reversed). Disadvantages of using isolation include small additional propagation delays and extra cost.

An optical isolator 710 may also be placed in series with the regulation amplifier 205 and the PWM 210 to reduce any feedback noise from the main output. Another possible embodiment is to refer both PWM controllers to a secondary ground, isolating between PWM 210 and the drive circuit 245 using a transformer or optoisolator. One with skill in the art will understand that numerous combinations of isolators may be used without departing from the scope and spirit of the invention.

For simplicity, the single-ended power trains disclosed do not explicitly specify the reset means for applying a negative voltage to balance or "reset" the magnetic flux in the core of the transformer after the end of a power delivery cycle. Any reset means may be employed, including but not limited to active clamp, resonant reset, reset windings, or others commonly known in the art.

Figure 8:
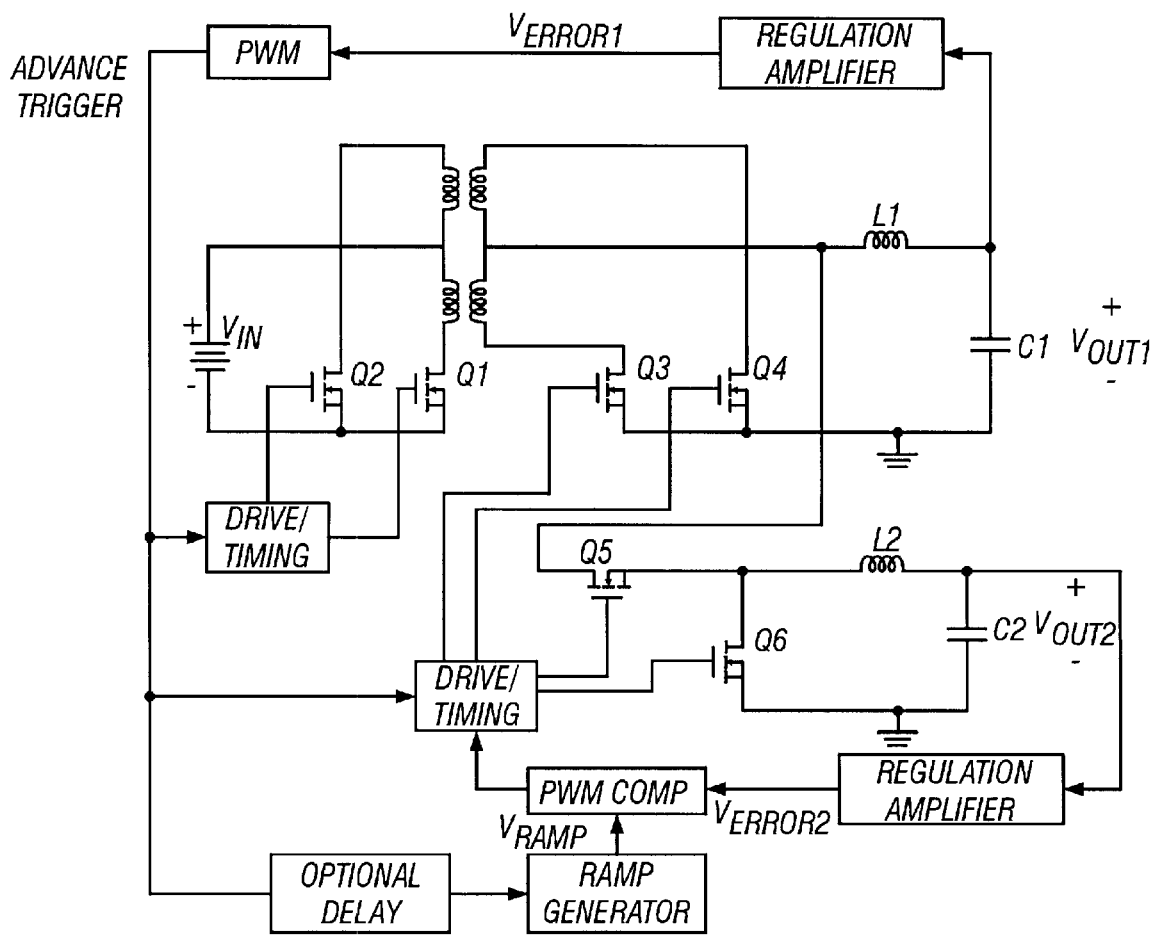
FIG. 8 is a schematic diagram of a post-regulated power supply with a double-ended transformer drive circuit in accordance with an embodiment of the invention.

Referring now to FIG. 8, a schematic diagram of a post-regulated power supply with a double-ended transformer drive circuit in accordance with the present invention is illustrated. The circuit in FIG. 8 illustrates a push-pull drive circuit commonly known in the art and shows that the present invention is not limited to any particular topology for the power converter. The advance trigger signal performs the same function of anticipating the power delivery cycle as is discussed in regard to FIG. 2. Other topologies are equally suitable, including half-bridge and full-bridge converters. Interleaved and paralleled power trains would also be suitable. Refer to the textbook entitled *Modern DC-to-DC Switchmode Power Converter Circuits* by Severens and Bloom, dated 1985 for examples of other buck derived topologies.

Figure 9:
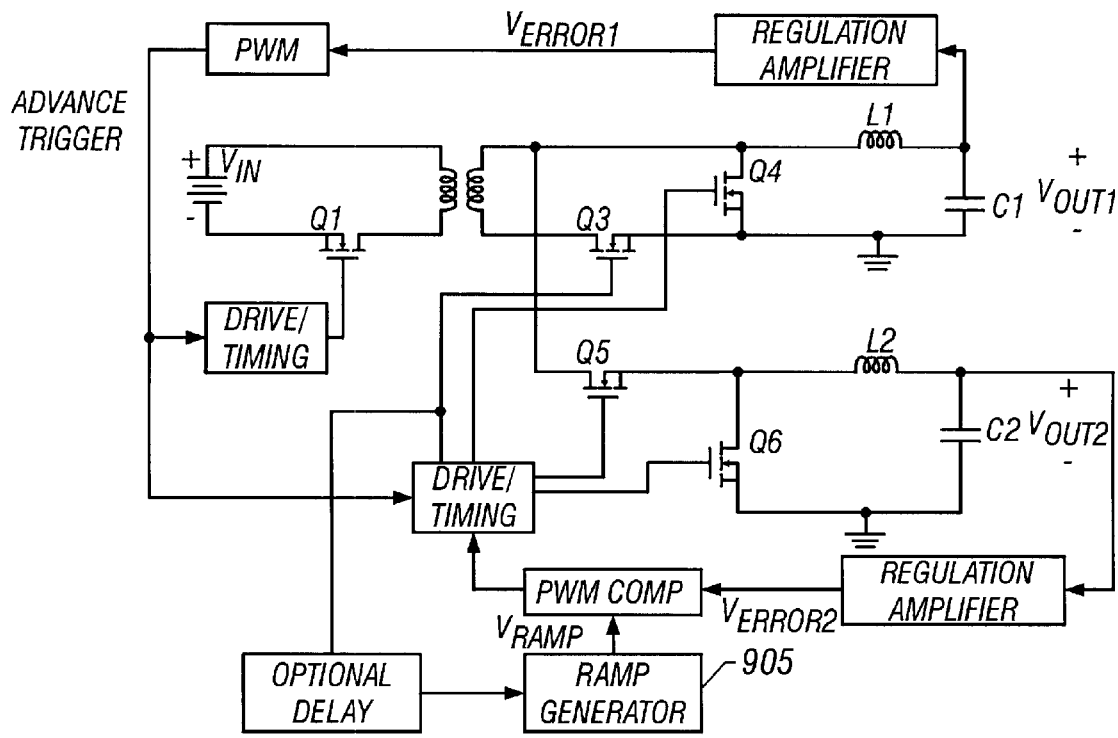
FIG. 9 is a schematic diagram of a post-regulated power supply in which the falling edge of the drive signal for a synchronous switch is used to reset the ramp generator in accordance with an embodiment of the invention.
Figure 10:
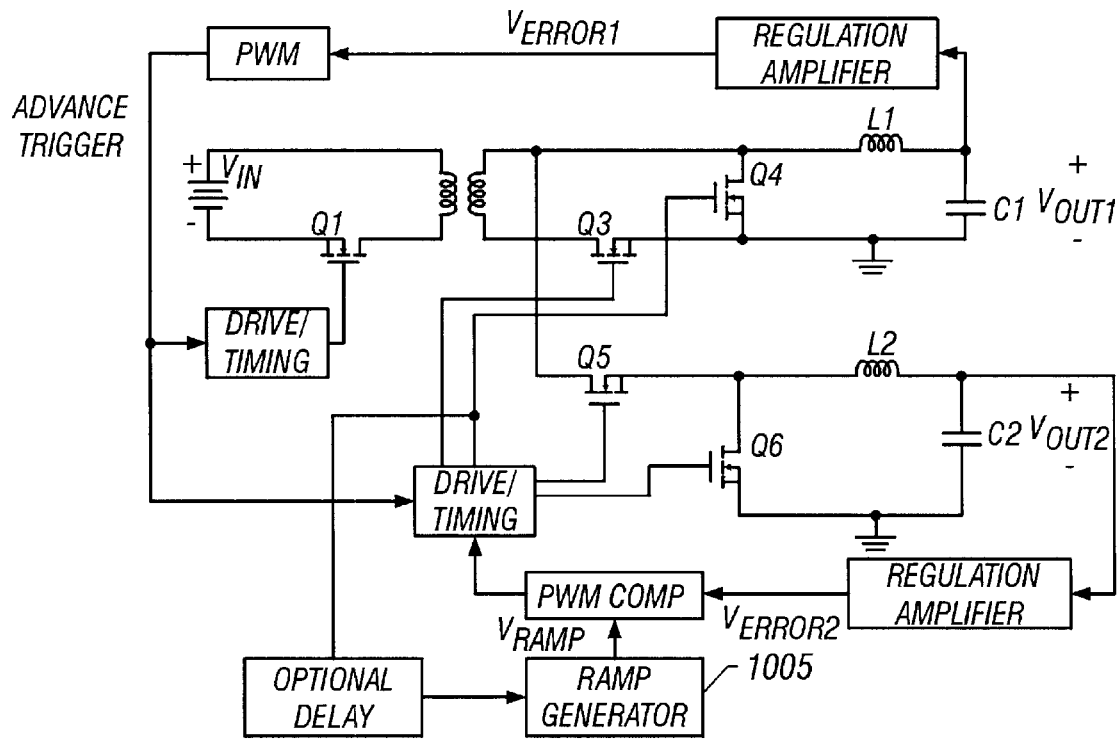
FIG. 10 is a schematic diagram of a post-regulated power supply in which the rising edge of the drive signal for a synchronous switch is used to reset the ramp generator in accordance with an embodiment of the invention.

Referring now to FIGS. 9 and 10, a schematic diagram of post-regulated power supply circuits in which the advance trigger signal does not directly reset the ramp generator are illustrated. In the circuit of FIG. 9, the ramp generator 905 is reset using the falling edge of the drive signal for synchronous rectifier switch Q3. In the circuit of FIG. 10, the ramp generator 1005 is reset using the rising edge of the drive signal for synchronous rectifier switch Q4. This embodiment of the invention provides the convenience of using a rising edge signal, which can simplify the implementation. This embodiment also provides assurance that the power delivery cycle has ended so that the post regulator ramp is not terminated prematurely (before the Q5 on-decision). Using the circuits of FIGS. 9 and 10, the advance trigger may be delayed before coupling into the ramp generator, and it may also be inverted or conditioned before it is used to reset the ramp generator.

Figure 11:
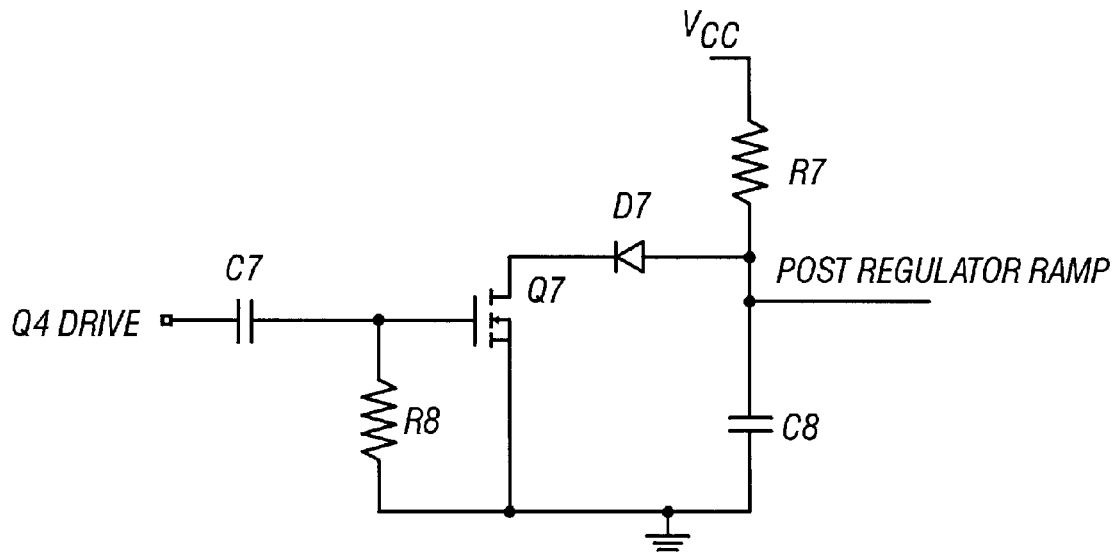
FIG. 11 is a schematic diagram of an edge coupling circuit that may be used as the ramp generator for the power supply shown in FIG. 10 in accordance with an embodiment of the invention.

Referring now to FIG. 11, a schematic diagram of an edge coupling circuit that may be used as the ramp generator 1005 for the post regulator of FIG. 10 is illustrated. In this embodiment, the ramp generator 1005 is reset on the rising edge of switch Q4. When Q4 goes high, switch Q6 is turned on, allowing current to flow through diode D7 and discharging capacitor C8 down to the DC offset level of the post regulator ramp generator 1005. This implementation employs a diode D7 to introduce a DC offset of the post-regulator ramp $V_{RAMP}$ as discussed above so that the error signal $V_{ERROR2}$ can be driven below the minimum value of the ramp while still remaining positive. The capacitor C7, resistor R8, and the gate to source capacitance of switch Q7 form an edge detector, applying a short pulse to the gate of switch Q6 on the rising edge of the Q4 drive. This pulse discharges C8 through diode D7. Resistor R8 quickly equalizes the voltage across the gate and source of switch Q7, turning off switch Q7 and allowing C8 to charge from $V_{cc}$ through resistor R7.

Figure 12:
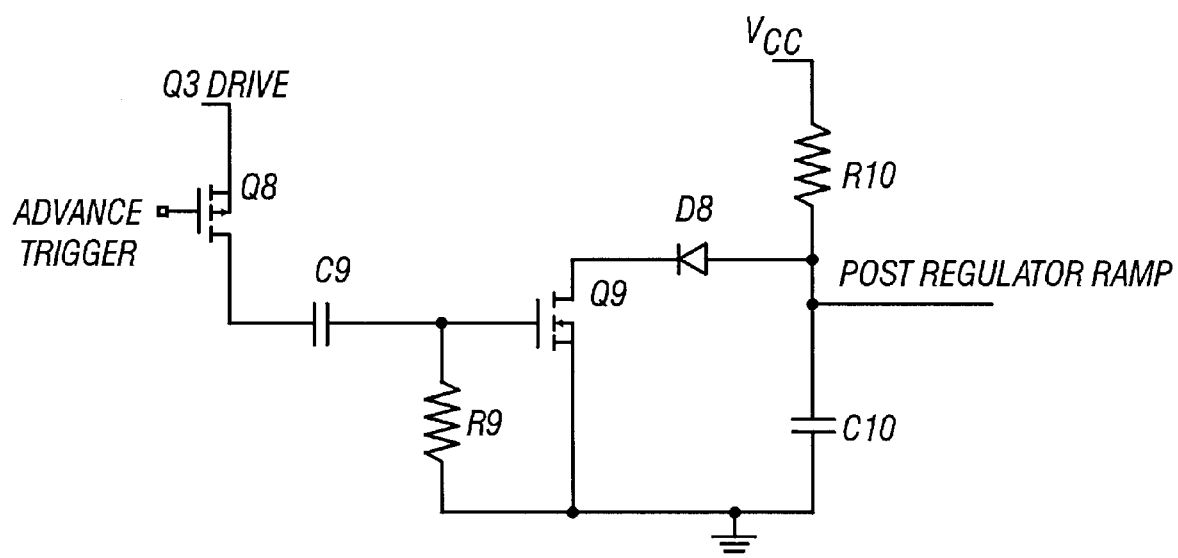
FIG. 12 is a schematic diagram of an edge coupling circuit that may be used as the ramp generator for the power supply shown in FIG. 9 in accordance with an embodiment of the invention.

Referring now to FIG. 12, a schematic diagram of an edge coupling circuit that may be used as the ramp generator 905 for the post regulator of FIG. 9 is illustrated. A reset of the ramp generator 905 is accomplished in this circuit by utilizing the delay between the falling edge of the advance trigger and the falling edge of the gate drive for switch Q3. During this short delay, the advance trigger signal is low while the gate drive for switch Q3 is high. Thus, a short pulse is sent through switch Q8 to enable switch Q9, allowing current to flow through diode D8 and switch Q9 and discharging the capacitor C10 down to the DC offset level of the post regulator ramp generator. The DC offset level is provided by the voltage drop across the diode D8. Thus, in this embodiment, the ramp generator is reset slightly before the end of the power delivery cycle, allowing slightly more time to account for propagation delays. The falling edge of the gate drive for switch Q3 discharges the capacitor C9 to prepare the edge detector for the next cycle.

Although the "Drive/Timing" blocks for the secondary switches in the circuits illustrated above in FIG. 2 and FIGS.

6–10 shows the advance trigger signal and the post regulator as the only inputs, the drive/timing block may incorporate adaptive timing techniques, self-driven techniques and other inputs, as required by the particular design.

Further, the invention is not limited to one post regulator circuit and output. Additional post regulators may be added as desired. The addition of a post regulator simply requires the duplication of switches Q5 and Q6, inductor L2 and capacitor C2 for each additional output and is connected to the secondary side of the transformer at the same point as the switch Q5. An additional regulation amplifier and a post regulator comparator are added. However, the ramp generator for the first post regulator circuit may be shared for the additional output. The necessary drive and timing circuitry as dictated by the desired design voltage completes the output. This can be accomplished to allow multiple outputs with the full regulation range allowed in the main output.

Those skilled in the art should understand that the previously described embodiments of the post regulated power supply are submitted for illustrative purposes only and other embodiments thereof are well within the scope and spirit of the present invention. Although the present invention has been described in detail, those skilled in the art should understand that they can make various changes, substitutions and alterations herein without departing from the spirit and scope of the invention in its broadest form.

What is claimed is:

1. A post-regulated multiple output power converter having a main output and an auxiliary output, said power converter comprising:
    a feedback loop for controlling a duty cycle of a power delivery switch on a primary side of said power converter to thereby regulate a main output voltage wherein said feedback loop produces an advance trigger signal that anticipates a transition of a power delivery cycle; and
    a post-regulator control circuit for regulating an auxiliary output voltage wherein said post-regulator control circuit is connected to said feedback loop such that said advance trigger signal may be utilized by said post-regulator control circuit to precisely control a timing in said post-regulator control circuit.

2. The power converter of claim 1 wherein said advance trigger signal comprises a pulse train generated by a pulse width modulator in said feedback loop wherein a leading edge of said pulse train anticipates a beginning of said power delivery cycle and wherein a trailing edge of said pulse train anticipates an end of said power delivery cycle.

3. The power converter of claim 2 wherein said advance trigger signal is utilized by said power converter to synchronize a drive of at least one switch with a drive of said power delivery switch.

4. The power converter of claim 1 wherein said advance trigger signal is utilized by said post regulator control circuit to reset a ramp generator.

5. The power converter of claim 4 wherein a trailing edge of said advance trigger signal triggers a reset of said ramp generator such that said ramp generator is reset prior to a beginning of a next power delivery cycle.

6. The power converter of claim 4 wherein a predetermined delay is introduced between said trailing edge of said advance trigger signal and said reset of said ramp generator.

7. The power converter of claim 1 wherein said feedback loop comprises a regulation amplifier connected to said main output, a pulse width modulator connected to said regulation amplifier, and a drive circuit connected in series with said pulse width modulator and said power delivery switch wherein said advance trigger signal is generated by said pulse width modulator.

8. The power converter of claim 1 wherein said advance trigger signal is isolated from said post regulator control circuit by an isolation circuit.

9. A post regulator control circuit for a power converter having a main output and an auxiliary output of a phase modulation type, said post regulator control circuit comprising:
    a regulation amplifier for comparing an output voltage of said auxiliary output to a reference voltage and generating an error signal in accordance therewith;
    a ramp generator means for providing a voltage ramp for comparison with said error signal;
    a pulse width modulator comparator for comparing said error signal to a voltage level of said voltage ramp to generate a pulse train in accordance with an amplitude of said error signal wherein said pulse train is used by a drive means to drive at least one auxiliary output switch to apply a voltage to said auxiliary output;
    an anticipation means for anticipating a transition of a power delivery switch in said power converter; and
    a reset means for causing a reset of said ramp generator in response to said anticipation means anticipating said transition of said power delivery switch.

10. The post regulator control circuit of claim 9 wherein said drive means also drives at least one main output switch to apply a voltage to said main output such that said at least one auxiliary output switch and said at least one main output switch may be synchronized with a power delivery cycle of said power converter using said anticipation means.

11. The post regulator control circuit of claim 9 wherein said regulation amplifier comprises an inverting amplifier in series with an inverter and wherein said ramp generator means generates an increasing ramp.

12. The post regulator control circuit of claim 9 wherein said anticipation means comprises an advance trigger signal generated by a feedback loop for said main output.

13. The post regulator control circuit of claim 12 wherein said reset means comprises an edge detector circuit for detecting an edge of said advance trigger signal and wherein said ramp generator is reset after said edge is detected.

14. A post-regulated multiple output power converter having a main output and an auxiliary output, a power source connected to a primary side of a transformer through a power delivery switch, a rectifier circuit attached to a secondary side of said transformer for rectifying alternating current into substantially direct current at said main output, and a feedback loop connected between said main output and said power delivery switch for regulating a voltage level of said main output, said power converter comprising:
    a main regulation amplifier in said feedback loop connected to said main output for comparing a voltage level of said main output with a main reference level and producing a main error signal in accordance therewith;
    a pulse width modulator in said feedback loop connected to said main regulation amplifier for producing a pulse train in accordance with said main error signal;
    a drive circuit in said feed back loop connected to said power delivery switch for driving said power delivery switch using said pulse train wherein a leading edge of said pulse train precedes a leading edge of a power delivery cycle and wherein a trailing edge of said pulse train precedes a trailing edge of said power delivery cycle such that said pulse train may be used to anticipate said leading edge of said power delivery cycle and said trailing edge of said power delivery cycle; and a post-regulator control circuit for regulating an auxiliary output voltage wherein said post-regulator control circuit is connected to said feedback loop such that said pulse train may be utilized by said post-regulator control circuit to anticipate a transition in said power delivery cycle.

15. The power converter of claim 14 wherein said post-regulator control circuit comprises:

an auxiliary regulation amplifier connected to said auxiliary output for comparing an auxiliary voltage level with an auxiliary reference level and producing an auxiliary error signal in accordance therewith;

a ramp generator for providing a voltage ramp for comparison with said auxiliary error signal wherein said ramp generator is reset by an edge of said pulse train;

a pulse width modulator comparator connected to said auxiliary regulation amplifier and said ramp generator for comparing said auxiliary error signal with said voltage ramp and developing an auxiliary pulse train in accordance therewith; and a drive circuit fed with said auxiliary pulse train for driving a switch to deliver power to said auxiliary output.

16. The power converter of claim 15 wherein said drive circuit synchronizes and drives a plurality of auxiliary switches and a plurality of main switches.

17. The power converter of claim 15 wherein said edge of said pulse train is said trailing edge.

18. The power converter of claim 15 wherein said auxiliary regulation amplifier comprises an inverting amplifier followed by an inverter and wherein said voltage ramp is a rising ramp.

19. The power converter of claim 14 wherein said power converter uses synchronous rectifier switches to rectify both said main output voltage and said auxiliary output voltage and wherein said leading edge and said trailing edge of said pulse train is used to synchronize said synchronous rectifier switches with said power delivery cycle.

20. The power converter of claim 15 wherein said edge of said pulse train is said falling edge.

* * * * *